No. 807,581. PATENTED DEC. 19, 1905.
H. SAURER.
VALVE GEAR FOR REGULATING DESCENDING AUTOMOBILES.
APPLICATION FILED NOV. 22, 1904.
3 SHEETS—SHEET 1.
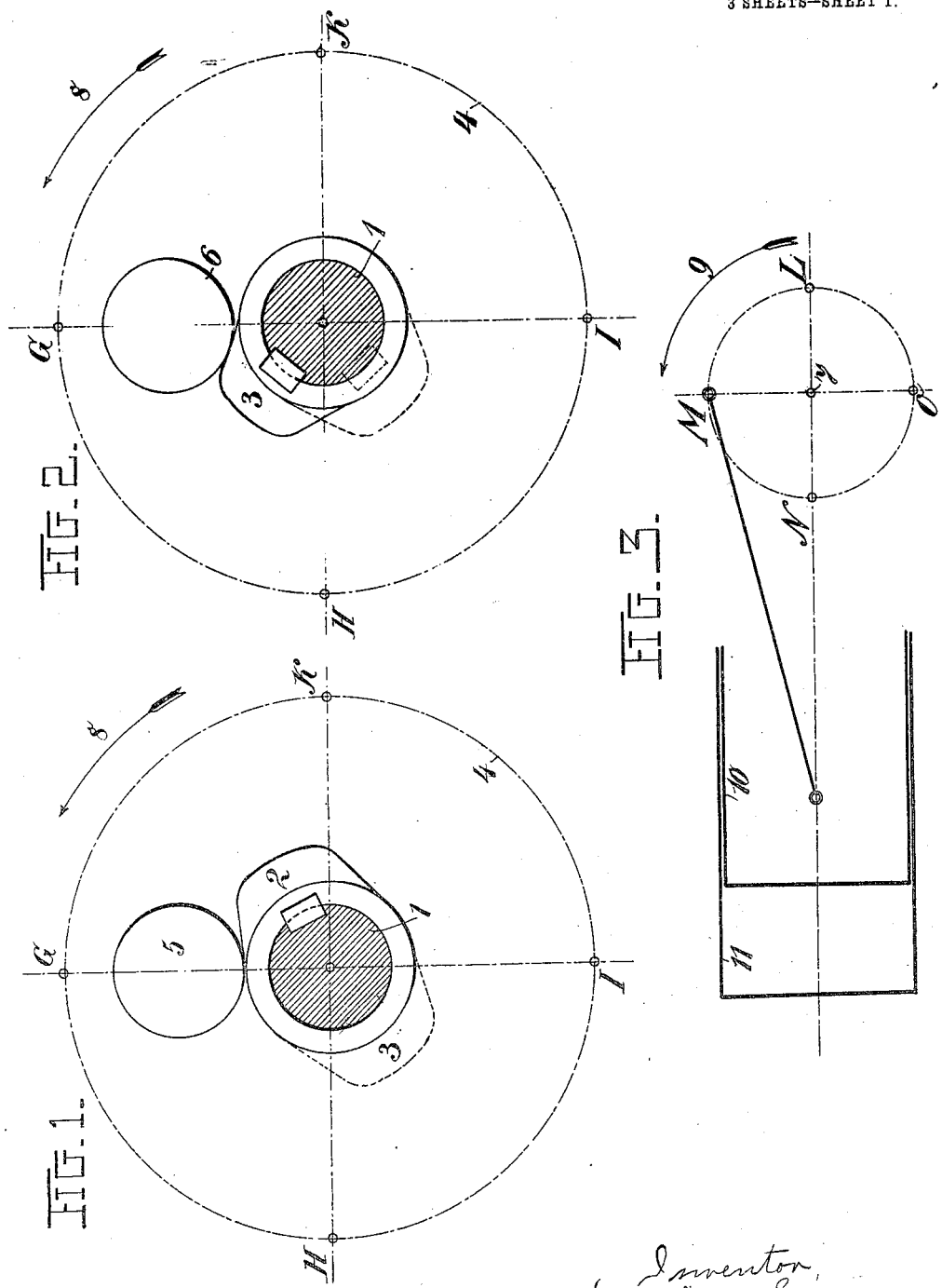

No. 807,581. PATENTED DEC. 19, 1905.
H. SAURER.
VALVE GEAR FOR REGULATING DESCENDING AUTOMOBILES.
APPLICATION FILED NOV. 22, 1904.
3 SHEETS—SHEET 2.
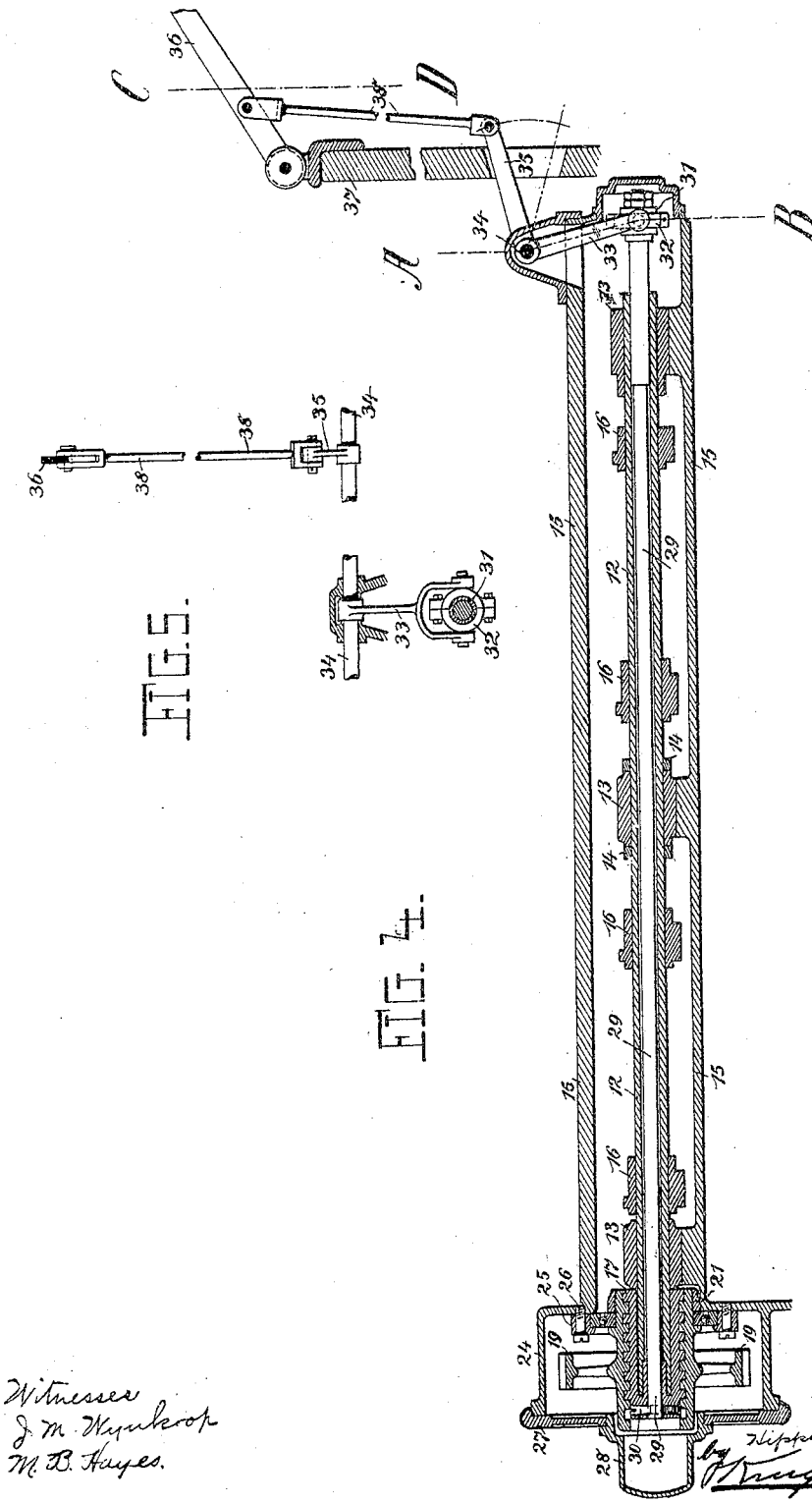

No. 807,581. PATENTED DEC. 19, 1905.
H. SAURER.
VALVE GEAR FOR REGULATING DESCENDING AUTOMOBILES.
APPLICATION FILED NOV. 22, 1904.

3 SHEETS—SHEET 3.

Witnesses
J. M. Wynkoop
M. B. Hayes

Inventor
Hippolyt Saurer,
by Knight Bros
Attys.

UNITED STATES PATENT OFFICE.

HIPPOLYT SAURER, OF ARBON, SWITZERLAND, ASSIGNOR TO THE FIRM OF ADOLPH SAURER, OF ARBON, SWITZERLAND.

VALVE-GEAR FOR REGULATING DESCENDING AUTOMOBILES.

No. 807,581.  Specification of Letters Patent.  Patented Dec. 19, 1905.

Application filed November 22, 1904. Serial No. 233,870.

*To all whom it may concern:*

Be it known that I, HIPPOLYT SAURER, a citizen of the Confederation of Switzerland, residing at Arbon, Switzerland, have invented a new and useful Valve-Gear for Regulating Descending Automobiles, of which the following is a specification.

The automobiles present the disadvantage that the regulation of their speed during long descents is very difficult, since the well-known braking devices, more particularly the band-brakes, are not suitable for this purpose, as they are liable to heating and rapid wear, so that the safety of the passengers is no longer guaranteed.

My invention relates to a valve-gear for regulating the automobiles provided with four-stroke-cycle explosion-motors, whereby this defect is remedied, while the use of the braking devices of every description is dispensed with during the long descents.

According to the invention the motor itself is employed for regulating the speed of the vehicle after the supply of the driving medium and the igniting device have been stopped, the motor being used as an air-compressor.

The objects of my invention are, first, to arrange on a first cam-shaft driven from the crank-shaft the cam or cams for actuating the inlet valve or valves; second, to provide a second cam-shaft carrying the cam or cams for actuating the outlet valve or valves; third, to provide the gear-wheel on this second cam-shaft with a steep female screw-thread in its nave; fourth, to provide a sleeve longitudinally movable on the second cam-shaft and externally provided with a male screw-thread which is adapted to engage in the steep female screw-thread of the gear-wheel, and, fifth, to provide means controlled from the driver's seat for longitudinally shifting this sleeve, and thereby displacing the second cam-shaft and its gear-wheel with regard to each other. I attain the said objects by the mechanism illustrated in the accompanying drawings, in which—

Figure 6:
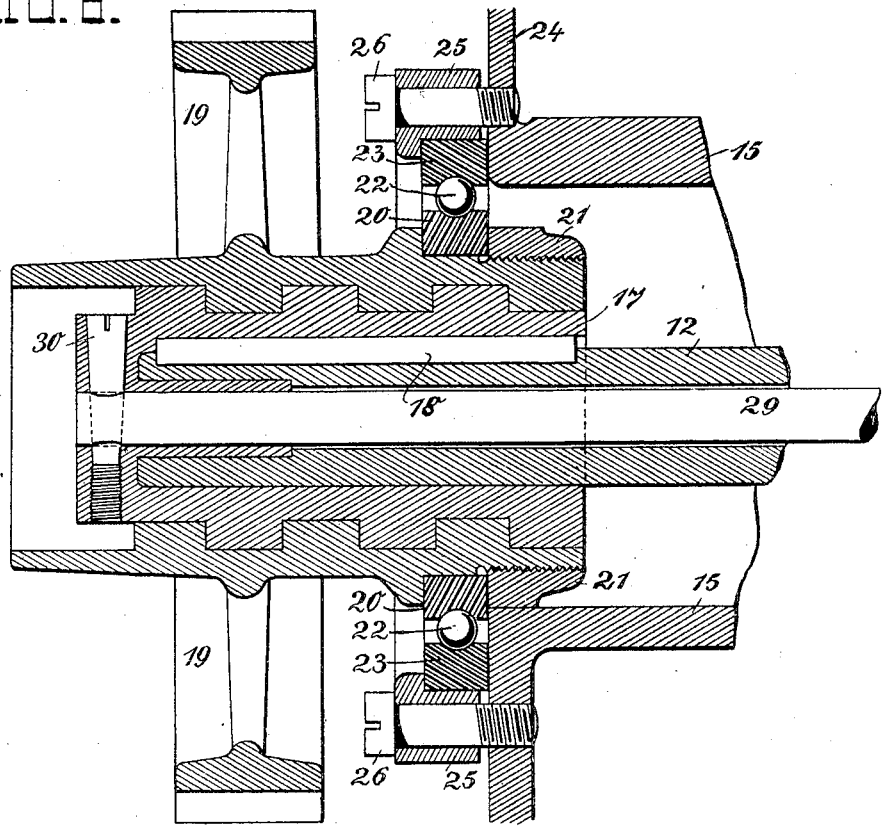
Figure 7:
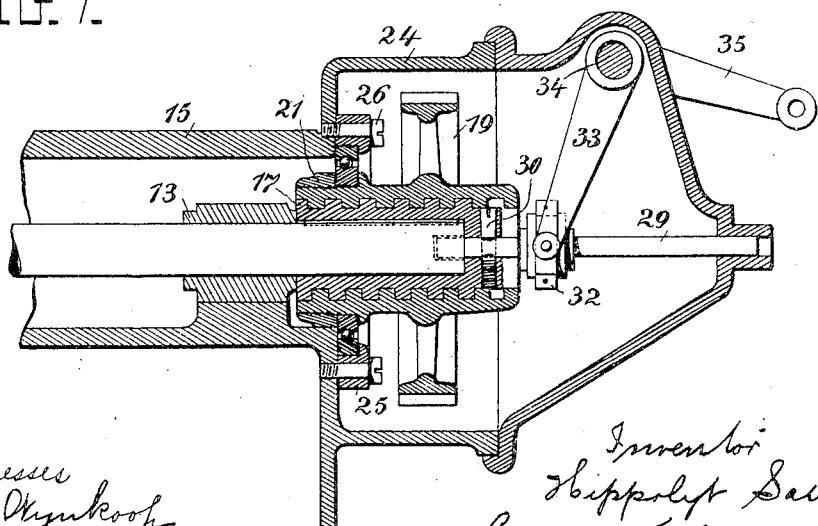

Figures 1 to 3 are diagrams, which will be referred to later on. Fig. 4 is a vertical longitudinal section through a casing, a second cam-shaft with four cams for actuating the four outlet-valves of a motor with four cylinders, an externally screw-threaded sleeve, and a gear-wheel on this shaft, the hand-lever and the parts therewith connected for controlling the sleeve being shown in elevation. Fig. 5 is on the left hand a section through the broken line A B and on the right hand a section through the line C D in Fig. 4 seen from right to left. Fig. 6 shows, on an enlarged scale, the left end of Fig. 4; and Fig. 7 shows a modification of the construction illustrated in Fig. 4.

Fig. 1 represents, for example, a cross-section through an ordinary cam-shaft 1 of a four-stroke-cycle explosion-motor immediately before the inlet-cam 2, while Fig. 2 is a cross-section through the same cam-shaft 1 immediately before the outlet-cam 3, the cam-shaft 1 occupying the same position in both Figs. 1 and 2. The cam-shaft 1 is driven from the crank-shaft 7 in Fig. 3 at the rate of two to one, as usual—that is to say, it makes but one revolution on every two revolutions of the crank-shaft 7, the gear-wheel or bevel-wheel being indicated by the dotted circle 4. The two cams 2 and 3 are assumed to act upon the inlet-valve and the outlet-valve, respectively, by means of two rollers 5 and 6. In general the two cams 2 and 3 are different in size or shape. In Figs. 1 and 2 the cam-shaft 1 is assumed to turn in the direction of the arrow 8 and in Fig. 3 the crank-shaft 7 in the same direction—*i. e.*, that of the arrow 9—but it will be understood that these directions of revolution may be different, according to the circumstances. When a point on the gear-wheel 4 moves from G through an angle of ninety degrees to H, then the crank-pin will move in the same time through an angle of one hundred and eighty degrees—for example, from N through O to L. The inlet-cam 2 is so disposed that during the path of the said point on the gear-wheel 4 from G to H the cam 2 will lift the roller 5, and thereby open the inlet-valve, so that during the first stroke of the piston 10, corresponding to the path of the crank-pin from N through O to L, air will be admitted to the cylinder 11. As is well known, in the normally working motor the air is compressed during the second piston-stroke in correspondence to the path of the said point on the gear-wheel 4 from H to I and to the revolution of the crank from L through M to N. The same is the case when the vehicle is descending and both the supply of the gas or other driving medium and the igniting device are stopped. The compressed air will then exert its power upon the crank-pin in the opposite direction—i. e., the vehicle will be retarded and not allowed to run fast. At the end of the second piston-stroke normally the igniting device would be actuated for causing the explosion of the mixture. When, however, the igniting device is stopped, the compressed air would simply expand during the third stroke of the piston 10—i. e., during the path of the said point on the gear-wheel 4 from I to K and that of the crank from N through O to L, which means that the compressed air would drive the vehicle forward and accelerate the same. This would be dangerous if the vehicle were to descend on a steep road, and therefore to prevent this I so turn the outlet-cam 3 on the cam-shaft 1 in the direction of the arrow 8 through an angle of about eighty or ninety degrees (according to the shape of the cam 3) as to bring it into the position indicated by the dotted lines in Fig. 2 and to enable the outlet-valve to act as an air-inlet valve during the third piston-stroke. On the outlet-valve opening at the beginning of the third stroke the compressed air will escape; but soon afterward fresh air will be sucked into the cylinder. Then during the following fourth stroke of the piston 10, corresponding to the path of the said point on gear-wheel 4 from K to G and to the revolution of the crank from L through M to N, the air will be compressed, so that its pressure acting upon the crank-pin will retard the vehicle. Thus air will be admitted to the cylinder 11 once on every revolution of the crank-shaft 7 by means of both the inlet-valve and the outlet-valve instead of once on every two revolutions of the crank-shaft by means of the inlet-valve alone, as hitherto during the normal work of the motor. For the sake of clearness I have marked in Fig. 1 the turned outlet-cam 3 by dotted lines.

It is obvious that in the above case the compressed air would produce the maximal resistance during the descent of the vehicle, so that there is a certain incline which the vehicle can run downward with perfect safety. This incline will of course depend upon the size of the motor and other circumstances and can be ascertained by trials. For less steep inclines the compressed air, or, in other words, the motor acting as an air-compressor, need not perform its maximal work. In such cases I turn the outlet-cam 3 through a smaller angle than hitherto, and this angle requires to be varied according to the circumstances. As will be plain to any one versed in the art to which this invention appertains, the resistance of the compressed air can be regulated by altering the angle of displacement between the cam-shaft 1 and the outlet-cam 3. When the outlet-cam 3 is so displaced on the cam-shaft 1 as to occupy an intermediate position between the full lines and the dotted lines in Fig. 2, it will be clear that during the third piston-stroke the air previously compressed during the second piston-stroke will be first allowed to expand until at an intermediate point of the stroke the outlet-valve is opened, when the air will be discharged, and thus prevented from further accelerating the vehicle. Soon afterward air is again sucked in. However, during the fourth piston-stroke part of this air will again escape through the still-open outlet-valve until the latter closes, when the rest of the air will be compressed. Of course this air will not attain so high a pressure as during the second piston-stroke.

Having now explained the manner of regulating the speed of the vehicle during long descents by means of the motor itself acting as an air-compressor, I now proceed to illustrate the manner in which the outlet cam or cams may be displaced according to my invention.

On the assumption of a motor having several cylinders, I prefer to dispose the several inlet-cams on a separate cam-shaft, which is driven from the crank-shaft in any known manner, be it by means of gear-wheels, bevel-wheels, or otherwise. As this manner is well known, I have not illustrated any cam-shaft with inlet-cams. The several outlet-cams, however, I prefer to dispose on a second separate cam-shaft, which may be driven in the same manner from the crank-shaft as the first cam-shaft or it may be geared to the latter. In Figs. 4 and 5 I have shown a second cam-shaft 12 for a motor with four cylinders. This shaft 12 is shown as made hollow and mounted to turn in three bearings 13 13, while it is prevented from longitudinally shifting by means of two loose collars 14 and set-screws or in any other known manner. I have assumed the three bearings 13 13 to be inclosed and supported by a tubular casing 15, which may be hung up or connected with the vehicle-frame in any suitable manner. On the hollow cam-shaft 12 are keyed the four outlet-cams 16 16, which are arranged to act upon the respective outlet-valves in any known manner—for instance, by means of rollers and levers. The latter may engage in suitable openings of the casing 15, which openings are not shown, as they are arranged, say, above the plane of the paper. A sleeve 17 is mounted to slide longitudinally on the left end of the hollow shaft 12 and is prevented from turning by a spline 18. This sleeve 17 is provided on its outside with a steep screw-thread adapted to engage the corresponding female screw-thread of a gear-wheel 19, by means of which latter the cam-shaft 12 is geared to the crank-shaft or the first cam-shaft, as the case may be. On the nave of the gear-wheel 19 a race 20 is secured by means of a nut 21, and this race is supported by a series of balls 22 22, running within the outer race 23. The latter is fastened on the wall of a widened part 24 of the casing 15 by means of suitable parts, such as a recessed ring 25 and bolts 26 26 or the like. The cover 27 is provided with a cap 28 to leave sufficient play to the sleeve 77 when moving to the left. In the cavity of the hollow cam-shaft 15 a rod 29 is mounted to move longitudinally. This rod 29 is shown as made for the most part from a tube and provided with solid ends, so as to reduce its weight. The left end of the rod 29 is rigidly connected with that of the sleeve 17 by means of a cross-bolt 30. On the right end of the rod 29 is fastened a grooved collar 31, in the groove of which a two-part ring 32 is disposed. The two pins of this ring 32 engage in the corresponding holes of the forked end of a lever 33. This lever 33 is fastened on a shaft 34, which is mounted to turn in suitable bearings and carries fast on it a lever 35. A hand-lever 36, near the driver's seat and supported by a suitable part 37 of the vehicle-frame, is pivotally connected with the lever 35 by means of a rod 38. The hand-lever 36 may be arranged in any known manner to be adjusted in any position—for example, by means of a notched bow. This hand-lever 36 is shown to occupy its one extreme position, and consequently also the screw-threaded sleeve 17 occupies its one extreme position on the right in the longitudinal direction, while the cam-shaft 12 occupies its one extreme position with regard to the gear-wheel 19 in the central plane of the latter. These positions of the several parts may be assumed to be the normal ones when the motor works as a four-stroke-cycle explosion-motor. The pitch of the screw-thread on the sleeve 17 and in the gear-wheel 19 is so proportioned that on the sleeve 17 being brought into its other extreme position on the left in Figs. 4 and 6 the hollow cam-shaft 12 will be reversed or brought into its other extreme position with regard to the gear-wheel 19—that is to say, the four outlet-cams 16 16 on the hollow cam-shaft 12 would be turned through an angle of about eighty or ninety degrees if they were so shaped as is described above with reference to Fig. 2, or they will be turned through any other angle as may be determined by the shape of these outlet-cams. When the gear-wheel 19 is assumed to work with the same gear-wheel on the crank-shaft as the corresponding gear-wheel on the first separate cam-shaft (not shown) carrying the four inlet-cams, of course these two cam-shafts will revolve in the same direction and synchronously. Then Fig. 1 may be assumed to represent the first cam-shaft and Fig. 2 the second cam-shaft 12 in Fig. 4 with reference to any of the four cylinders of the motor.

The manner of operating the mechanism illustrated in Figs. 4 to 6 is as follows: The hand-lever 36 occupies its normal position—say the one shown at Fig. 4—as long as the automobile stops or runs either on horizontal roads or uphill on inclined roads. The motor is started and stopped in the usual manner with the aid of the respective known devices. When the motor is running, of course the gear-wheel 19 on the second cam-shaft 12 will revolve, say, in the direction of the arrow 8 in Fig. 2. Then the race 20 on the nave of the gear-wheel 19 will run on the balls 22, and be thereby prevented from shifting longitudinally. As the relative position of the gear-wheel 19 and the hollow cam-shaft 12, with the four outlet-cams 16 16, remains unaltered, the sleeve 17 being prevented from longitudinal motion by the rod 29, of course the gear-wheel 19 will take along with it by the threaded and splined sleeve 17 the hollow cam-shaft 12 and put the latter into rotation. Owing to the bolt 30, also the rod 29 partakes in the revolution of the cam-shaft 12, which is permitted by the grooved collar 31 turning freely in the opening of the two-part ring 32. The latter prevents the rod 29 from moving longitudinally. When the vehicle descends and its speed requires to be regulated with the aid of compressed air, the supply of the driving medium is stopped and the igniting device rendered inactive, while the hand-lever 36 is turned downward through a convenient angle, determined by experience or trials, in accordance with the angle of inclination of the road and then secured in its new position. Then by means of the parts 38, 35, 34, 33, and 32 the rod 29, and therewith also the threaded sleeve 17, is moved through a corresponding distance to the left, whereby the relative position of the hollow cam-shaft 12 and the gear-wheel 19 is changed. Then the outlet-valves will be opened at the corresponding points of the respective piston-strokes during the third strokes of the several cylinders to allow the expanding compressed air to escape and afterward to again admit air to the cylinders, as has been explained above. Should the road become steeper, of course the hand-lever 36 must be turned farther downward to change the relative position of the cam-shaft 12 and the gear-wheel 19. It is only necessary to so adjust the hand-lever 36, and thereby to regulate the work of the motor acting as an air-compressor, that the speed of the descending vehicle remains within the desired limits. It is evident that in case the gear-wheel 19 meshes into an equal gear-wheel on the first cam-shaft the two cam-shafts will revolve in opposite directions, but still synchronously. The cams on these shafts will require to be put in the respective directions the same as the screw-thread of the sleeve 17 requires to be of the proper hand; otherwise the whole mechanism is operated in a similar manner as before.

In Fig. 4 the gear-wheel 19 is assumed to be far away from the driver's seat. Should the former be near the latter, of course the cam-shaft 12 need not be made hollow; but the rod 29 may be connected direct with the sleeve 17 and mounted to turn in an additional bearing, as is clearly shown at Fig. 7, which requires no further explanation.

The mechanism described so far may be varied in many respects without deviating from the spirit of my invention.

What I claim as my invention, and desire to secure by Letters Patent, is—

1. In an automobile having a four-stroke-cycle explosion-motor, the combination with an outlet-cam shaft, of a plurality of outlet-cams on said outlet-cam shaft for actuating the respective outlet-valves, a sleeve longitudinally movable on said outlet-cam shaft while prevented from turning thereon and provided on the outside with a steep screw-thread, a gear-wheel driven from the crank-shaft at the rate of one revolution to two revolutions of the latter and having in its nave a female screw-thread engaging the steep screw-thread of said sleeve, means for preventing said gear-wheel from longitudinal motion, an adjustable hand-lever controlled from the driver's seat, a bell-crank lever, a rod pivotally connecting said adjustable hand-lever with the one arm of said bell-crank lever, a shaft connected with said sleeve and mounted to turn in the axis of said outlet-cam shaft, and means pivotally connecting the other arm of said bell-crank lever with said shaft while allowing the latter to turn.

2. In an automobile having a four-stroke-cycle explosion-motor, the combination with a hollow outlet-cam shaft, of a plurality of outlet-cams on said hollow outlet-cam shaft for actuating the respective outlet-valves, a sleeve longitudinally movable on said hollow outlet-cam shaft while prevented from turning thereon and provided on the outside with a steep screw-thread, a gear-wheel driven from the crank-shaft at the rate of one revolution to two revolutions of the latter and having in its nave a female screw-thread engaging the steep screw-thread of said sleeve, means for preventing said gear-wheel from longitudinal motion, an adjustable hand-lever controlled from the driver's seat, a bell-crank lever, a rod pivotally connecting said adjustable hand-lever with the one arm of said bell-crank lever, a shaft mounted to turn in the cavity of said hollow outlet-cam shaft and connected with said sleeve, and means pivotally connecting the other arm of said bell-crank lever with said shaft while allowing the latter to turn.

In testimony whereof I have signed my name to this specification in the presence of two subscribing witnesses.

HIPPOLYT SAURER.

Witnesses:
HERNANDO DE SOTO,
CARL KAUFMANN.